(No Model.)
W. G. PETRY.
COFFEE MAKING APPARATUS.
No. 249,084. Patented Nov. 1, 1881.
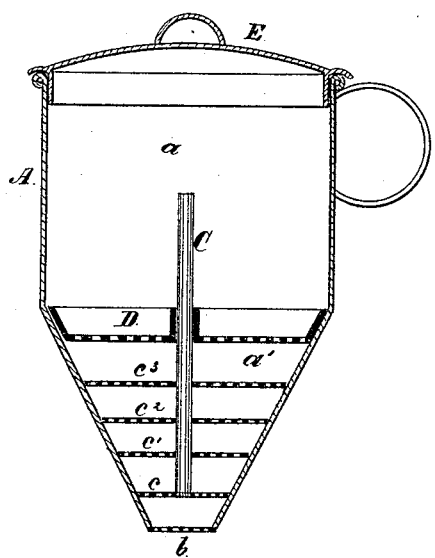
WITNESSES:
INVENTOR
BY
ATTORNEY

UNITED STATES PATENT OFFICE.

WENTWORTH G. PETRY, OF QUEBEC, PROVINCE OF QUEBEC, CANADA.

COFFEE-MAKING APPARATUS.

SPECIFICATION forming part of Letters Patent No. 249,084, dated November 1, 1881.

Application filed September 19, 1881. (No model.) Patented in Canada February 26, 1880.

*To all whom it may concern:*

Be it known that I, WENTWORTH G. PETRY, of the city, district, and Province of Quebec, Dominion of Canada, am the inventor of an Improved Coffee-Making Apparatus, of which the following is a full, clear, and exact description, reference being had to the accompanying drawing, forming part of this specification.

My invention relates to an apparatus for producing potable coffee by the percolation of boiling water through a quantity of the crushed or ground berries; and it consists in the combination of devices hereinafter at length described and shown, and more particularly recited in the claim.

The figure is a vertical central sectional view of an apparatus embodying my invention.

A is a vessel, the upper part preferably cylindrical, as at $a$, and the lower part of which is made tapering or cone-shaped, as at $a'$, and forms a funnel, as shown. An opening in the apex or lower end of this cone or funnel is provided with a perforated piece or cap, $b$, as shown.

C is a rod, on the lower end of which is fixed a perforated circular plate, $c$, of such a diameter that when introduced into the funnel it will fit against the interior thereof at a point or line more or less above the lower end, $b$, of said funnel, as shown.

$c'$ $c^2$ $c^3$ are circular perforated plates arranged to slide upon the rod C by means of a central orifice in each of them, through which the rod passes, and said plates are respectively graduated in diameter to fit successively against the interior of the funnel $a'$, one above the other, at a greater or less distance apart, according to the number of said plates employed, as shown in the drawings.

D is a circular perforated plate or tray, arranged similarly to the plates described, to slide upon the rod C, and is formed so that its outer edge or circumference will fit against the interior of the funnel $a'$ at the upper part thereof, and at or about where said funnel is united to the vessel $a$.

E is a lid to close the vessel A.

The object of my invention, as described, is to afford in a single apparatus the means of producing a desired and designated quantity of potable coffee, whether such quantity be more or less—namely, one cupful, for instance, or two or more cupfuls—by the percolation of boiling water through a mass of the crushed or ground berries, and to confine and hold the said berries between two perforated plates in a mass, so that said mass of the berries, while the process of percolation is going on, will not be disturbed or have the particles of which it is composed floated or dashed about within the vessel by the action of the flow of the water.

In coffee-percolators as at present constituted, if a less quantity of the ground berries than will fill the entire space within the apparatus be placed therein and the boiling water be then introduced, the mass of the berries will be greatly disturbed by the flow of the water, and its particles will be separated and floated and dashed about within the percolator. The complete and successful extraction of the essence of the berries is thus defeated, as the water, in order for the process to be satisfactory and thorough, should percolate slowly through a quiescent mass of the ground berries; and it frequently occurs in the use of these percolators that at one time it is desired to produce a less—say one cupful—and at another time a greater quantity—say two or more cupfuls—of potable coffee, and to use no more of the ground coffee than is requisite to produce the quantity of potable coffee desired. It is to enable this to be done conveniently and successfully by a single apparatus that my invention is adapted.

It is evident that the funnel $a'$ may have placed within it such a quantity of the ground berries as will produce the desired and predetermined quantity of potable coffee, and that then, by introducing the rod C and pressing it down upon the mass of coffee, one or another of the plates $c$, $c'$, $c^2$, $c^3$, or D, according as the quantity is greater or less, will rest upon the upper surface of the mass of the coffee, and will fit at its circumference against the interior of the vessel, and will confine the said mass between it and the lower perforated end or opening, $b$, the other plates adjusting themselves within the vessel, the smaller ones lying immediately under the plate which rests on top of the coffee, and the larger ones falling into place against the interior of the vessel above said plate. The boiling water when introduced will percolate slowly and evenly through the confined mass of the berries, and will not disturb said mass, and the best results in extracting the essence of the berries by percolation will be secured, while any desired quantity of potable coffee may be secured from a certain specific quantity of the berries.

What I claim as my invention, and desire to secure by Letters Patent, is—

The combination, in a coffee-making apparatus, of the vessel A with the funnel $a'$, having at its lower end the perforated plate $b$, together with the rod C, carrying on its lower end the perforated plate $c$, and having arranged to slide thereon the perforated plates $c'$, $c^2$, $c^3$, and D, one above the other, and of gradually-increasing diameter, respectively, so that the said plates when introduced into said funnel will fit at their circumference against the interior thereof at a greater or less distance apart, whereby there is afforded in a single apparatus the means of producing a predetermined and variable quantity of potable coffee from a relatively proper quantity of the ground berries, and of confining the mass of such quantity of the ground berries between two of said plates within the vessel during the operation of percolation, as and for the purpose specified.

Witness my hand 30th of August, 1881.

WENTWORTH GRAY PETRY.

In presence of—

JAMES C. LLOYD,
    *Of Quebec, Advocate.*

JAMES McCAUGHRAN,
    *Of Quebec, Clerk.*